(12) United States Patent
Miner et al.

(10) Patent No.: US 9,831,971 B1
(45) Date of Patent: Nov. 28, 2017

(54) METHOD AND SYSTEM FOR OPERATING A COMMUNICATION SYSTEM ENCODED INTO MULTIPLE INDEPENDENTLY COMMUNICATED ENCODING FORMATS

(75) Inventors: Daniel M. Miner, Redondo Beach, CA (US); Douglas E. Ribordy, Emeryville, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 2002 days.

(21) Appl. No.: 13/080,551

(22) Filed: Apr. 5, 2011

(51) Int. Cl.
  *H04N 7/50* (2006.01)
  *H04J 3/02* (2006.01)
  *G06K 9/36* (2006.01)

(52) U.S. Cl.
  CPC ..................... *H04J 3/02* (2013.01)

(58) Field of Classification Search
  CPC .. H04N 7/50; H04N 7/26351; H04N 7/26643; H04N 7/26244; H04N 7/26276
  USPC ........................................................ 375/240
  See application file for complete search history.

(56) References Cited

U.S. PATENT DOCUMENTS

| | | | |
|---|---|---|---|
| 4,317,010 A | 2/1982 | Fillot | |
| 4,984,252 A | 1/1991 | Morimoto | |
| 5,155,483 A | 10/1992 | Morimoto | |
| 5,189,516 A | 2/1993 | Angell et al. | |
| 5,257,106 A | 10/1993 | Maruoka | |
| 5,323,322 A | 6/1994 | Mueller et al. | |
| 5,327,421 A | 7/1994 | Hiller et al. | |
| 5,351,130 A | 9/1994 | Dugan et al. | |
| 5,452,297 A | 9/1995 | Hiller et al. | |
| 5,493,339 A * | 2/1996 | Birch | H04N 5/4401 348/461 |
| 5,499,046 A | 3/1996 | Schiller et al. | |
| 5,513,180 A | 4/1996 | Miyake et al. | |
| 5,524,113 A | 6/1996 | Gaddis | |
| 5,566,353 A | 10/1996 | Cho et al. | |
| 5,583,562 A | 12/1996 | Birch et al. | |
| 5,600,573 A | 2/1997 | Hendricks et al. | |
| 5,646,675 A | 7/1997 | Copriviza et al. | |
| 5,659,350 A | 8/1997 | Hendricks et al. | |
| 5,666,293 A | 9/1997 | Metz et al. | |
| 5,666,487 A | 9/1997 | Goodman et al. | |

(Continued)

FOREIGN PATENT DOCUMENTS

WO 03/058967 A1 7/2003

OTHER PUBLICATIONS

Non-final Office action dated Jun. 22, 2011 in U.S. Appl. No. 12/264,435, filed Nov. 4, 2008 by Douglas E. Ribordy et al.

(Continued)

*Primary Examiner* — Sath V Perungavoor
*Assistant Examiner* — Howard D Brown, Jr.
(74) *Attorney, Agent, or Firm* — Harness, Dickey & Pierce, PLC

(57) ABSTRACT

A system and method for operating the same includes a receiving circuit module having a housing having an input for a first signal, a first encoder disposed within the housing encoding the first signal to form a first encoded signal and a second encoder disposed within the housing encoding the first signal to form a second encoded signal having a different format than the first signal. A first multiplexer receives the first encoded signal. A second multiplexer different than the first multiplexer receives the second encoded signal.

20 Claims, 13 Drawing Sheets

(56) References Cited

U.S. PATENT DOCUMENTS

| | | |
|---|---|---|
| 5,684,714 A | 11/1997 | Yogeshwar et al. |
| 5,708,961 A | 1/1998 | Hylton et al. |
| 5,793,413 A | 8/1998 | Hylton et al. |
| 5,926,230 A | 7/1999 | Niijima et al. |
| 5,930,251 A | 7/1999 | Murakami et al. |
| 5,933,123 A | 8/1999 | Kaul |
| 5,999,518 A | 12/1999 | Nattkemper et al. |
| 6,047,162 A | 4/2000 | Lazaris-Brunner et al. |
| 6,154,772 A | 11/2000 | Dunn et al. |
| 6,272,137 B1 | 8/2001 | Noiri |
| 6,308,286 B1 | 10/2001 | Richmond et al. |
| 6,401,242 B1 | 6/2002 | Eyer et al. |
| 6,434,562 B1 | 8/2002 | Pennywitt et al. |
| 6,490,273 B1 | 12/2002 | DeNap et al. |
| 6,496,522 B1 | 12/2002 | Takizawa et al. |
| 6,510,163 B1 | 1/2003 | Won |
| 6,529,146 B1 | 3/2003 | Kowalski et al. |
| 6,557,031 B1 | 4/2003 | Mimura et al. |
| 6,563,955 B2 * | 5/2003 | de Queiroz ............ H04N 1/41 382/239 |
| 6,625,811 B1 | 9/2003 | Kaneko |
| 6,654,923 B1 | 11/2003 | Grenier et al. |
| 6,724,760 B2 | 4/2004 | Uchida |
| 6,724,774 B1 | 4/2004 | Sashide |
| 6,728,317 B1 * | 4/2004 | Demos ................ H04N 5/14 348/E5.108 |
| 6,741,553 B1 | 5/2004 | Grenier |
| 6,751,214 B1 | 6/2004 | Parruck et al. |
| 6,782,550 B1 | 8/2004 | Cao |
| 6,795,506 B1 | 9/2004 | Zhang et al. |
| 6,796,555 B1 | 9/2004 | Blahut |
| 6,873,877 B1 | 3/2005 | Tobias et al. |
| 6,910,078 B1 | 6/2005 | Raman et al. |
| 6,963,547 B1 | 11/2005 | Kwak et al. |
| 7,039,116 B1 | 5/2006 | Zhang et al. |
| 7,039,937 B1 | 5/2006 | Glenn |
| 7,072,365 B1 | 7/2006 | Ansley |
| 7,080,398 B1 | 7/2006 | Wichelman et al. |
| 7,209,636 B2 | 4/2007 | Imahashi et al. |
| 7,212,738 B1 | 5/2007 | Wang |
| 7,219,367 B2 | 5/2007 | Briggs |
| 7,224,837 B2 | 5/2007 | Olshansky et al. |
| 7,266,133 B2 * | 9/2007 | Wu .................... H04J 3/1688 370/539 |
| 7,302,224 B2 | 11/2007 | Sibley et al. |
| 7,315,887 B1 | 1/2008 | Liang et al. |
| 7,317,837 B2 * | 1/2008 | Yatabe ............... H04N 19/197 375/E7.088 |
| 7,330,509 B2 * | 2/2008 | Lu ...................... H04N 19/40 375/240.03 |
| 7,333,425 B2 | 2/2008 | Huck et al. |
| 7,346,918 B2 | 3/2008 | Hennenhoefer et al. |
| 7,380,264 B2 | 5/2008 | Potrebic |
| 7,460,832 B2 | 12/2008 | Lee et al. |
| 7,493,648 B2 | 2/2009 | Hisamatsu et al. |
| 7,525,993 B2 | 4/2009 | Yousef |
| 7,529,276 B1 | 5/2009 | Ramakrishnan |
| 7,580,612 B2 | 8/2009 | Sato et al. |
| 7,587,736 B2 * | 9/2009 | Summers et al. ............. 725/95 |
| 7,596,350 B1 | 9/2009 | Ladrach |
| 7,602,846 B1 * | 10/2009 | Wu ............... H04N 21/234309 375/240.12 |
| 7,607,154 B2 | 10/2009 | Morello |
| 7,650,620 B2 | 1/2010 | Fish et al. |
| 7,746,791 B2 | 6/2010 | Wimmer |
| 7,835,596 B2 * | 11/2010 | Hornback, Jr. .... H04N 1/00127 382/173 |
| 7,861,270 B2 * | 12/2010 | St. Laurent ............ H04H 20/26 725/105 |
| 8,072,874 B2 * | 12/2011 | Pham ................. H04B 7/185 370/216 |
| 8,077,706 B2 * | 12/2011 | Wasden ................ H04L 1/22 370/359 |
| 8,139,517 B2 | 3/2012 | Oger et al. |
| 8,170,069 B2 * | 5/2012 | Pham ............... H04N 21/23424 370/240 |
| 2001/0003846 A1 | 6/2001 | Rowe et al. |
| 2001/0026537 A1 | 10/2001 | Massey |
| 2001/0036198 A1 | 11/2001 | Arsenault et al. |
| 2002/0007494 A1 | 1/2002 | Hodge |
| 2002/0023165 A1 | 2/2002 | Lahr |
| 2002/0053049 A1 | 5/2002 | Shiomoto et al. |
| 2002/0061023 A1 | 5/2002 | Takizawa et al. |
| 2002/0105976 A1 | 8/2002 | Kelly et al. |
| 2002/0150061 A1 | 10/2002 | Arenault |
| 2002/0186320 A1 | 12/2002 | Carlsgaard et al. |
| 2002/0194596 A1 | 12/2002 | Srivastava |
| 2003/0007564 A1 | 1/2003 | Jeong |
| 2003/0018975 A1 | 1/2003 | Stone |
| 2003/0028897 A1 | 2/2003 | Brooks |
| 2003/0088873 A1 | 5/2003 | McCoy et al. |
| 2003/0095554 A1 | 5/2003 | Shimizu |
| 2003/0140353 A1 | 7/2003 | Hugenberg et al. |
| 2003/0161262 A1 | 8/2003 | Hosoi |
| 2003/0196211 A1 | 10/2003 | Chan |
| 2003/0217362 A1 | 11/2003 | Summers et al. |
| 2004/0001478 A1 | 1/2004 | Wong |
| 2004/0022275 A1 | 2/2004 | Blanchard |
| 2004/0022535 A1 | 2/2004 | Wang et al. |
| 2004/0078807 A1 | 4/2004 | Fries et al. |
| 2004/0117831 A1 | 6/2004 | Ellis et al. |
| 2004/0120349 A1 | 6/2004 | Border et al. |
| 2004/0181813 A1 | 9/2004 | Ota et al. |
| 2004/0213247 A1 | 10/2004 | Seki et al. |
| 2004/0216171 A1 | 10/2004 | Barone et al. |
| 2004/0234145 A1 | 11/2004 | Yatabe et al. |
| 2004/0255333 A1 | 12/2004 | Kenworthy |
| 2005/0002339 A1 | 1/2005 | Patil et al. |
| 2005/0076134 A1 | 4/2005 | Bialik et al. |
| 2005/0086696 A1 | 4/2005 | Daniels |
| 2005/0099969 A1 | 5/2005 | Roberts et al. |
| 2005/0155079 A1 | 7/2005 | Chen et al. |
| 2005/0160477 A1 | 7/2005 | Saito |
| 2005/0175085 A1 | 8/2005 | Bergen et al. |
| 2005/0210123 A1 | 9/2005 | Wang et al. |
| 2005/0210133 A1 | 9/2005 | Florissi et al. |
| 2005/0240967 A1 | 10/2005 | Anderson et al. |
| 2006/0018254 A1 | 1/2006 | Sanders et al. |
| 2006/0035610 A1 | 2/2006 | Potrebic |
| 2006/0050184 A1 | 3/2006 | McMiller et al. |
| 2006/0064726 A1 | 3/2006 | Loner |
| 2006/0083315 A1 | 4/2006 | Sato et al. |
| 2006/0085834 A1 | 4/2006 | Chang et al. |
| 2006/0098735 A1 | 5/2006 | Chang |
| 2006/0126634 A1 | 6/2006 | Park |
| 2006/0166699 A1 | 7/2006 | Aghvami et al. |
| 2006/0198389 A1 | 9/2006 | Erickson et al. |
| 2006/0242674 A1 | 10/2006 | Medford et al. |
| 2007/0002851 A1 | 1/2007 | Paila et al. |
| 2007/0022438 A1 | 1/2007 | Arseneau et al. |
| 2007/0040933 A1 | 2/2007 | Seong |
| 2007/0053379 A1 | 3/2007 | Hershey et al. |
| 2007/0079351 A1 | 4/2007 | Wang et al. |
| 2007/0091857 A1 | 4/2007 | Elstermann |
| 2007/0094691 A1 | 4/2007 | Gazdzinski |
| 2007/0118861 A1 | 5/2007 | Stone |
| 2007/0121189 A1 * | 5/2007 | Zami et al. ................ 359/246 |
| 2007/0136765 A1 | 6/2007 | Shah et al. |
| 2007/0136777 A1 | 6/2007 | Hasek et al. |
| 2007/0157281 A1 | 7/2007 | Ellis et al. |
| 2007/0162927 A1 | 7/2007 | Ramaswamy et al. |
| 2007/0186251 A1 | 8/2007 | Horowitz et al. |
| 2007/0204300 A1 | 8/2007 | Markley et al. |
| 2007/0204311 A1 | 8/2007 | Hasek et al. |
| 2007/0261073 A1 | 11/2007 | Blumenschein et al. |
| 2007/0263627 A1 | 11/2007 | Karino et al. |
| 2007/0268817 A1 | 11/2007 | Smallegange et al. |
| 2007/0291713 A1 | 12/2007 | Machida |
| 2008/0066096 A1 | 3/2008 | Wollmershauser et al. |
| 2008/0069155 A1 | 3/2008 | Honhart |
| 2008/0101455 A1 | 5/2008 | Scheelke |
| 2008/0102750 A1 | 5/2008 | Keener et al. |
| 2008/0137543 A1 | 6/2008 | Mitra |

(56) References Cited

U.S. PATENT DOCUMENTS

| | | |
|---|---|---|
| 2008/0201748 A1 | 8/2008 | Hasek et al. |
| 2008/0282011 A1 | 11/2008 | Tsai et al. |
| 2008/0291907 A1 | 11/2008 | Rogasch |
| 2009/0022241 A1 | 1/2009 | Fukuoka et al. |
| 2009/0025027 A1 | 1/2009 | Craner |
| 2009/0052323 A1 | 2/2009 | Breynaert et al. |
| 2009/0066848 A1* | 3/2009 | St. Laurent et al. ......... 348/731 |
| 2009/0067365 A1 | 3/2009 | Pham et al. |
| 2009/0067432 A1 | 3/2009 | St. Laurent et al. |
| 2009/0067433 A1 | 3/2009 | St. Laurent et al. |
| 2009/0067490 A1 | 3/2009 | Barroso |
| 2009/0069021 A1 | 3/2009 | Barroso |
| 2009/0070824 A1 | 3/2009 | Barroso |
| 2009/0070825 A1 | 3/2009 | Pham et al. |
| 2009/0070830 A1* | 3/2009 | Pham .................... H04N 7/162 725/71 |
| 2009/0070846 A1 | 3/2009 | St. Laurent et al. |
| 2009/0109836 A1 | 4/2009 | Wasden et al. |
| 2009/0109883 A1 | 4/2009 | Wasden et al. |
| 2009/0110052 A1 | 4/2009 | Wasden et al. |
| 2009/0113490 A1 | 4/2009 | Wasden et al. |
| 2009/0213814 A1 | 8/2009 | Heo et al. |
| 2009/0254962 A1 | 10/2009 | Hendricks et al. |
| 2010/0023972 A1* | 1/2010 | Summers et al. .............. 725/54 |
| 2010/0208595 A1 | 8/2010 | Zhao et al. |

OTHER PUBLICATIONS

Final Rejection dated Oct. 31, 2011 in U.S. Appl. No. 12/264,435, filed Nov. 4, 2008 by Douglas E. Ribordy et al.

Non-final Office action dated Jul. 2, 2012 in U.S. Appl. No. 12/264,435, filed Nov. 4, 2008 by Douglas E. Ribordy et al.

Final Rejection dated Dec. 12, 2012 in U.S. Appl. No. 12/264,435, filed Nov. 4, 2008 by Douglas E. Ribordy et al.

Non-final Office action dated Sep. 6, 2013 in U.S. Appl. No. 12/264,435, filed Nov. 4, 2008 by Douglas E. Ribordy et al.

Final Rejection dated Feb. 5, 2014 in U.S. Appl. No. 12/264,435, filed Nov. 4, 2008 by Douglas E. Ribordy et al.

"Specification for the Use of Video and Audio Coding in DVB Services Delivered Directly Over IP Protocols"; DVB Document Rev. 2; May 2007.

International Search Report and Written Opinion dated Feb. 15, 2010 in International Application No. PCT/US2009/063003 filed Nov. 2, 2009 by Douglas E. Ribordy et al.

\* cited by examiner

METHOD AND SYSTEM FOR OPERATING A COMMUNICATION SYSTEM ENCODED INTO MULTIPLE INDEPENDENTLY COMMUNICATED ENCODING FORMATS

TECHNICAL FIELD

The present disclosure relates generally to communication systems and, more particularly, to a method and system for encoding a channel signal into multiple independently communicatable encoding formats.

BACKGROUND

The statements in this section merely provide background information related to the present disclosure and may not constitute prior art.

Satellite broadcasting of television signals has increased in popularity. Satellite television providers continually offer more and unique services to their subscribers to enhance the viewing experience. Providing reliability in a satellite broadcasting system is therefore an important goal of satellite broadcast providers. Providing reliable signals reduces the overall cost of the system by reducing the number of received calls at a customer call center.

In satellite broadcasting systems, users have come to expect the inclusion of local channels in addition to the channels broadcast for the entire Continental United States. Collecting the channels may be performed in various manners, including providing a manned station that receives the signals. The signals may be uplinked from various locations. Providing manned stations increases the labor costs and thus increases the overall cost of the service.

The Moving Pictures Expert Group (MPEG) sets standards for encoded video. The MPEG-2 standard may be used for standard-definition video. An MPEG-4 encoding scheme has also been developed to support both high-definition and standard-definition video. MPEG-4 is the latest standard and newer systems use the MPEG-4 standard. However, providers of video service such as DIRECTV® also have customers that have set top boxes that only support the MPEG-2 standard.

Typically, for each type of encoding, separate equipment is provided. Encoders for MPEG-2 format and MPEG-4 format must be provided along with any associated equipment prior to uplinking. Providing separate equipment increases the floor space and thus increases the cost of providing services.

SUMMARY

The present disclosure provides a receiving circuit module that can output two different encoded channel signals. The encoded channel signals may be output simultaneously and then routed to separate multiplexers. The multiplexers can be located at different uplink facilities.

In one aspect of the invention, a method includes receiving a first signal at the receiving circuit module, encoding the first signal within the receiving circuit module to form a first encoded signal, encoding the first signal within the receiving circuit module to form a second encoded signal encoded differently than the first encoded signal, generating a first output signal at the receiving circuit module corresponding to the first encoded signal, generating a second output signal at the receiving circuit module corresponding to the second encoded signal, communicating the first encoded signal to a first multiplexer, and communicating the second encoded signal to a second multiplexer different than the first multiplexer.

In another aspect of the invention, a system includes a receiving circuit module having a housing having an input for a first signal, a first encoder disposed within the housing encoding the first signal to form a first encoded signal, and a second encoder disposed within the housing encoding the first signal to form a second encoded signal having a different format than the first signal. A first multiplexer receives the first encoded signal. A second multiplexer different than the first multiplexer receives the second encoded signal.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
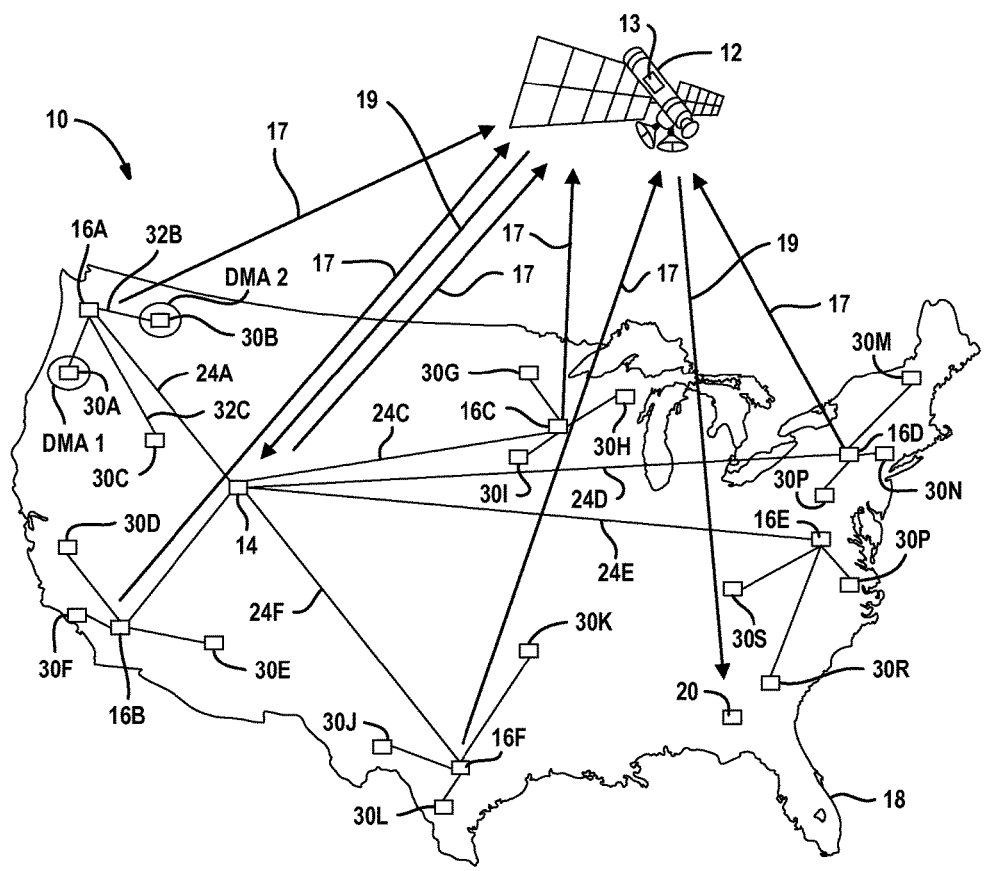
FIG. 1 is an overall system view of a collection and communication system in the continental United States.

The following description is merely exemplary in nature and is not intended to limit the present disclosure, application, or uses. It should be understood that throughout the drawings, corresponding reference numerals indicate like or corresponding parts and features.

As used herein, the term module, circuit and/or device refers to an Application-Specific Integrated Circuit (ASIC), an electronic circuit, a processor (shared, dedicated, or group) and memory that executes one or more software or firmware programs, a combinational logic circuit, and/or other suitable components that provide the described functionality. As used herein, the phrase at least one of A, B, and C should be construed to mean a logical (A or B or C), using a non-exclusive logical OR. It should be understood that steps within a method may be executed in different order without altering the principles of the present disclosure.

The present disclosure is described with respect to a satellite television system. However, the present disclosure may have various uses including satellite data transmission and reception for home or business uses. The system may also be used in a cable system or wireless terrestrial communication system.

Referring now to FIG. 1, a collection and communication system 10 includes a satellite 12 that includes at least one transponder 13. Typically, multiple transponders are used in a satellite. Although only one satellite is shown, more than one is possible or even likely.

The collection and communication system 10 includes a central facility or Network Operations Center (NOC) 14 and a plurality of regional or remote uplink facilities (RUF) 16A, 16B, 16C, 16D, 16E and 16F. In a non-satellite system the facilities may be referred to as a remote facility. The regional or remote uplink facilities 16A-16F may be located at various locations throughout a landmass 18 such as the continental United States, including more or less locations than those illustrated. The regional or remote uplink facilities 16A-16F uplink various uplink signals 17 to satellite 12. The satellite 12 downlinks signals 19 to various users 20 that may be located in different areas of the landmass 18. The users 20 may be mobile or fixed users. The uplink signals 17 may be digital signals such as digital television signals or digital data signals. The digital television signals may be high-definition television signals, standard-definition signals, or combinations of both. Uplinking may be performed at various frequencies including Ka band. The present disclosure, however, is not limited to Ka band. However, Ka band is a suitable frequency example used throughout this disclosure. The central facility or NOC 14 may also receive downlink signals 19 corresponding to the uplink signals 17 from the various regional or remote uplink facilities and from itself for monitoring purposes. The central facility 14 may monitor and control the quality of all the signals broadcast from the system 10.

The central facility 14 may also be coupled to the regional or remote uplink facilities through a network such as a computer network having associated communication lines 24A-24F. Each communication line 24A-F is associated with a respective regional or remote uplink site 16. Communication lines 24A-24F are terrestrial-based lines. As will be further described below, all of the functions performed at the regional or remote uplink facilities may be controlled centrally at the central facility 14 as long as the associated communication lines 24A-F are not interrupted. When a communication line 24A-F is interrupted, each regional or remote uplink site 16A-F may operate autonomously so that uplink signals may continually be provided to the satellite 12. Each of the regional or remote uplink and central facilities includes a transmitting and receiving antenna which is not shown for simplicity in FIG. 1.

Each of the regional or remote uplink facilities 16A-16F may also be in communication with a local collection facility collectively referred to with reference numeral 30. As illustrated in FIG. 1, three local collection facilities are associated with each remote uplink facility 16. For example, remote uplink facility 16A has local collection facilities 30A, 30B and 30C associated therewith. Local collection facilities 30D-30S are associated with one of the other remote uplink facilities 16B-16F. Although only three local collection facilities are illustrated for each remote uplink facility 16, numerous local collection facilities may be associated with each remote uplink facility 16. The number of local collection facilities 30 may be numerous, such as 40 for each remote uplink facility. The number of local collection facilities 30 is limited by the amount of equipment and the capabilities thereof associated with each remote uplink facility 16.

The local collection facilities 30 are used for collecting local television stations in various designated marketing areas (DMA). As is illustrated, local collection facility 30A is located in DMA1 and local collection facility 30B is located in DMA2. For simplicity, only two DMAs are illustrated. However, each local collection facility may be located in a DMA.

The local collection facilities 30 may be in communication with each remote uplink facility 16 through a communication network 32. As will be described below, the communication network 32 may be an internet protocol (IP) network. The signals from the local collection facilities 30 may thus be video-over-IP signals. Each of the remote uplink facilities 16 is in communication with each local collection facility 30 through the communication network 32. As is illustrated, local collection facility 30A is in communication with the remote uplink facility 16A through communication network 32A, while local collection facility 30B is in communication with the remote uplink facility 16A through communication network 32B, and so on.

Figure 2:
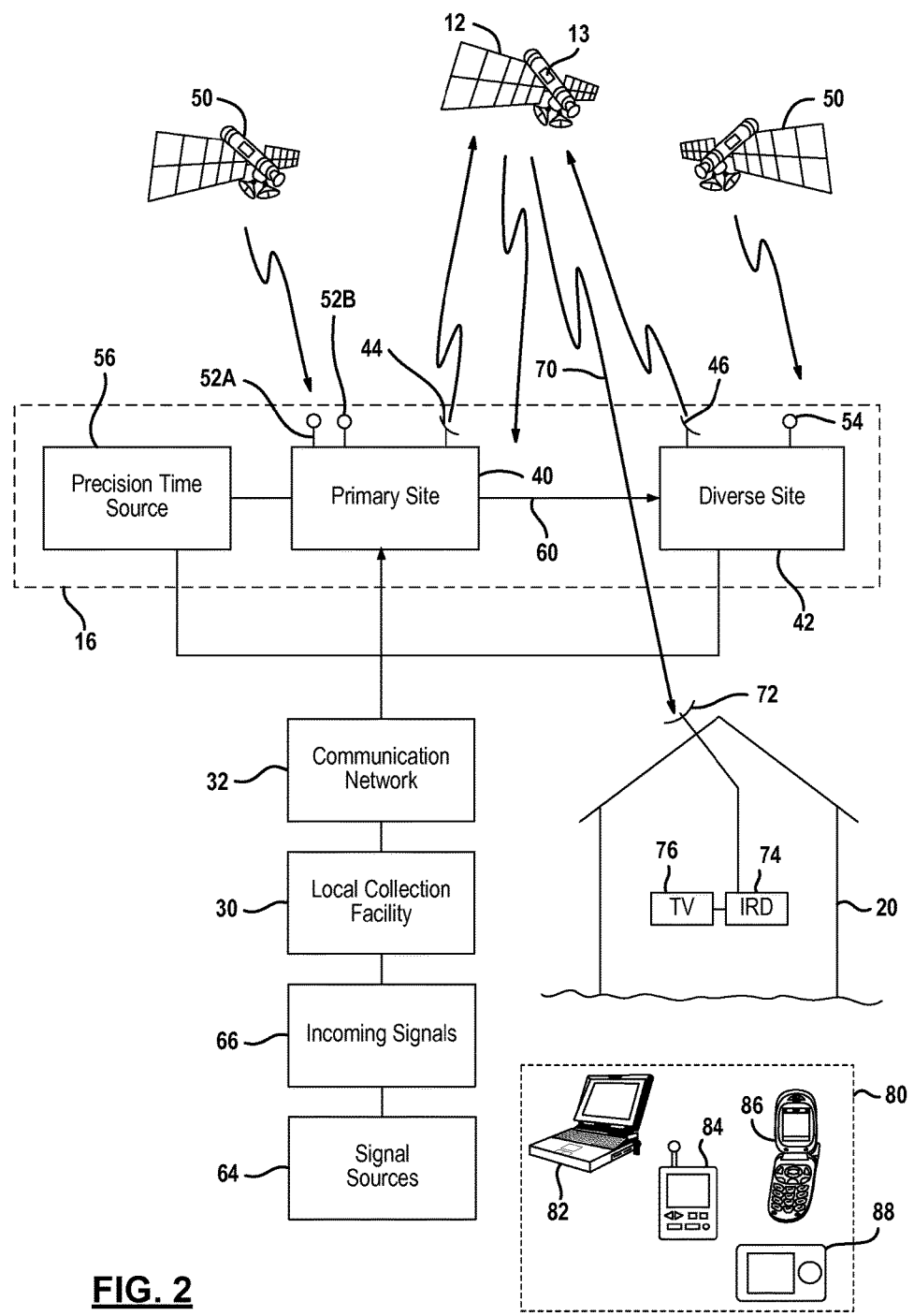
FIG. 2 is a system view at the regional level of the collection and communication system.

Referring now to FIG. 2, the regional or remote uplink facilities 16A-16F of FIG. 1 are illustrated collectively as reference numeral 16. The regional facilities 16 may actually comprise two facilities that include a primary site 40 (such as the remote uplink facility 16 above) and a diverse site 42. The primary site 40 may be referred to as a primary broadcast center (PBC). As will be described below, the central site 14 may also include a primary site and diverse site as is set forth herein. The primary site 40 and diverse site 42 of both the central and regional sites may be separated by at least 25 miles or even more such as at least 40 miles. In one constructed embodiment, 50 miles was used. The primary site 40 includes a first antenna 44 for transmitting and receiving signals to and from satellite 12. Diverse site 42 also includes an antenna 46 for transmitting and receiving signals from satellite 12.

Primary site 40 and diverse site 42 may also receive signals from GPS satellites 50. GPS satellites 50 generate signals corresponding to the location and a precision timed signal that may be provided to the primary site 40 through an antenna 52 and to the diverse site 42 through an antenna 54. It should be noted that redundant GPS antennas (52A-52B) for each site may be provided. In some configurations, antennas 44 and 46 may also be used to receive GPS signals.

A precision time source 56 may also be coupled to the primary site 40 and to the diverse site 42 for providing a precision time source. The precision time source 56 may include various sources such as coupling to a central atomic clock. The precision time source 56 may be used to trigger certain events such as advertising insertions and the like.

The primary site 40 and the diverse site 42 may be coupled through a communication line 60. Communication line 60 may be a dedicated communication line. The primary site 40 and the diverse site 42 may communicate over the communication line using a video over internet protocol (IP).

Various signal sources 64 such as an optical fiber line, copper line or antennas may provide incoming signals 66 to the local collection facility 30. Incoming signal 66, as mentioned above, may be television signals. The television signals may be over-the-air high-definition signals, over-the-air standard television signals, or high- or standard-definition signals received through a terrestrial communication line. The incoming signals 66 such as the television signals may be routed from the local collection facility 30 through the communication network 32 to the primary site 40, or the diverse site 42 in the event of a switchover. The switchover may be manual or a weather-related automatic switchover. A manual switchover, for example, may be used during a maintenance condition.

Users 20 receive downlink signals 70 corresponding to the television signals. Users 20 may include home-based systems, business-based systems or multiple dwelling unit systems. As illustrated, a user 20 has a receiving antenna 72 coupled to an integrated receiver decoder (IRD) 74 that processes the signals and generates audio and video signals corresponding to the received downlink signal 70 for display on the television or monitor 76. It should also be noted that satellite radio receiving systems may also be used in place of the integrated receiver decoder (IRD) 74. The IRD 74 may be incorporated into or may be referred to as a set top box.

Of course, the system may include multiple users with different types of IRDs 74 capable of decoding signals encoded differently. Some older IRDs may be capable of only decoding MPEG-2 encoded signals. Some newer IRDs may only be able to decode MPEG-4 encoded signals. Some IRDs may be capable of decoding both MPEG-2 and MPEG-4 encoded signals.

The user 20 may also be a mobile user. The user 20 may therefore be implemented in a mobile device or portable device 80. The portable device 80 may include, but is not limited to, various types of devices such as a laptop computer 82, a personal digital assistant 84, a cellular telephone 86 or a portable media player 88. Of course, the mobile devices may be capable of decoding various types of encoded signals.

Figure 3:
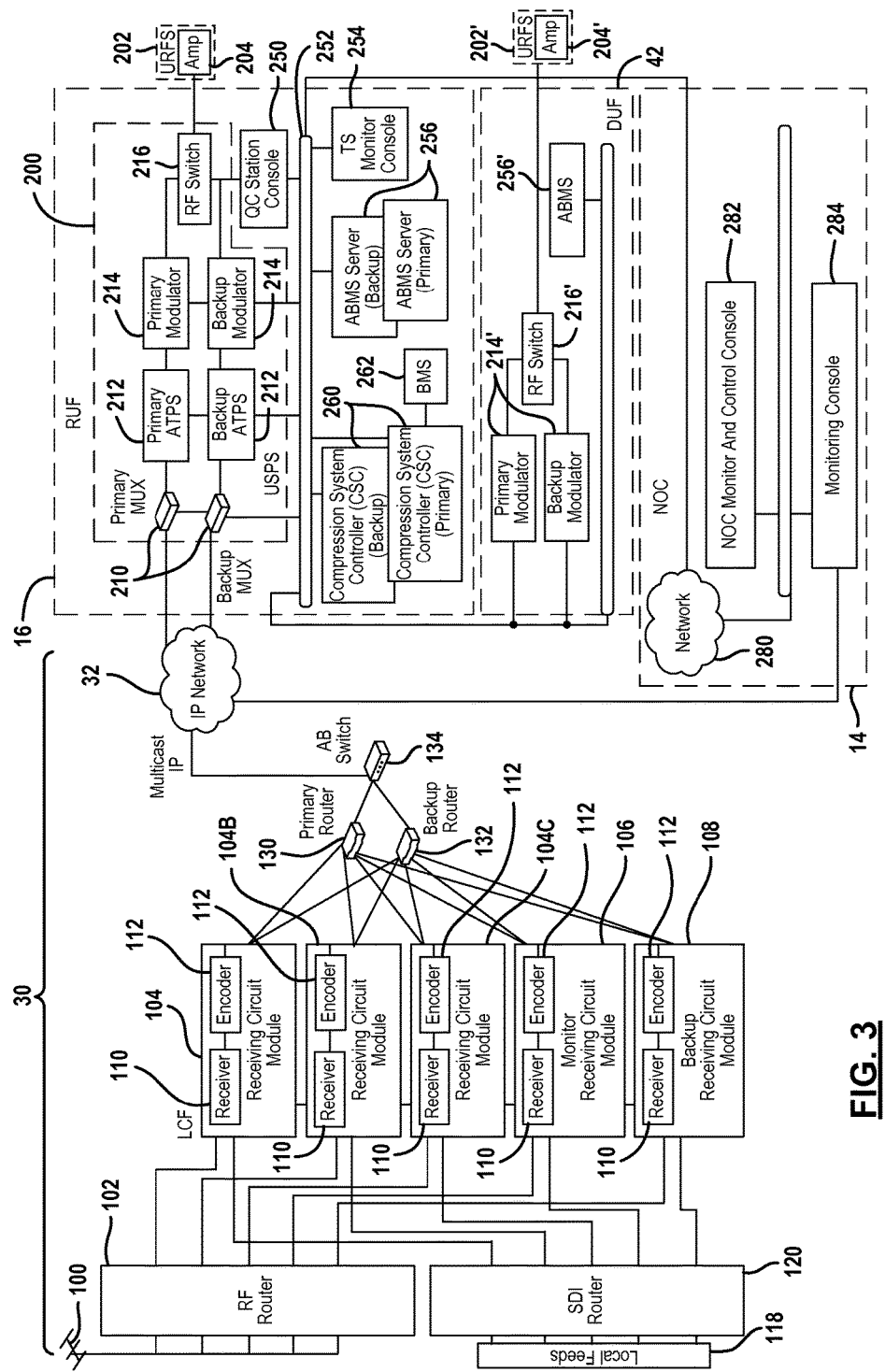
FIG. 3 is a detailed block diagrammatic view of a first embodiment of the collection and communication system illustrated in FIGS. 1 and 2.

Referring now to FIG. 3, the local collection facility 30 is illustrated in more detail adjacent to the remote uplink facility (RUF) 16. As mentioned above, the local collection facility 30 is in communication with the remote uplink facility 16 through a network 32 such as an IP network. The local collection facility 30 is used for collecting signals in a designated marketing area or other area. The channel signals may be received as over-the-air television signals or through a direct local feed such as an optical fiber or wire. For an over-the-air signal, an antenna or plurality of antennas 100 is provided. The antenna channel signals are directed to a router 102. The router signals are communicated to a plurality of receiver circuit modules 104A-C (collectively referred to as 104). The number of receiver circuit modules 104 depends upon various design parameters such as how many channels the designated market includes. Various numbers of receiver circuit modules 104 may be provided.

In addition to the receiver circuit modules 104, a monitor receiver circuit module 106 may also be coupled to the RF router 102. Also, a back-up receiver circuit module 108 may be included at the local collection facility 30.

The details of the receiver circuit modules 104A-C, 106 and 108 will be further described below. However, the receiver circuit modules generally include a receiver module 110 and an encoder module 112. The encoder module 112 may include the capability to produce more than one type of encoded signal. The receiver module 110 is used to tune, demodulate and decode the over-the-air signals. The decoder may decode from MPEG-2 format. The receiver circuit module, as will be described below, includes an ATSC receiver. The receive signals are processed and encoded into a format such an IP format in the encoder 112. The monitor receiver circuit module is used for generating monitor circuits for each of the receive channel signals. That is, although only one receiver module may be provided, the monitoring system may monitor one of the channel signals. This may be performed remotely through the network 32 from the remote uplink facility 16. The encoder 112 may encode into MPEG-4 format, MPEG-2 format or both MPEG-2 and MPEG-4 formats.

A serial digital interface router 120 may also be provided. The serial digital interface router may be a high-definition serial digital interface router. The serial digital interface (SDI) router 120 may receive local feeds directly from the local channel providers. These may be provided through a wire or optical fiber. The SDI router 120 routes the channel signals received from the local feeds 118 to the receiving circuit modules 104A-C, 106 and 108.

The output of the receiving circuit modules 104A-C, 106 and 108 are in communication with a primary router 130 and a back-up router 132. A suitable example of a primary and back-up router is a Cisco® 7604. Preferably each of the receiving circuit modules 104, 106 and 108 are in communication with both the primary router 130 and the back-up router 132. An A-B switch 134 is used to generate an output signal corresponding to one of the primary routers 130 or the back-up router 132. The routers 130, 132 route the IP signals through the switch 134 and through the network 32 which communicates the encoded channel signals to the remote uplink facility 16, diverse uplink facility and the network operation center. The routers 130, 132 and the switch 134 may be monitored and controlled by the compression system controlled or ABMS system described below.

The remote uplink facility 16 may include an uplink signal processing system (USPS) 200. In a constructed embodiment several uplink signal processing systems 200 may be provided. This may include a secondary or back-up USPS that will be referred to as an engineering USPS 200' described in FIG. 4 below. The encoded channel signals routed through the network 32 include identification of the signals so that the signals may be properly routed to the proper uplink signal processing system. As described below, this may be done by multicasting. The uplink signal processing system 200 generates an output signal to an uplink RF system (URFS) 202 that includes a power amplifier 204. The output signal of each USPS 200 may correspond to one transponder of a satellite. The output signal is a multiplexed signal that may include both high-definition television signals and standard-definition television signals. The uplink signal processing system 200 may also provide redundant pairs to increase the reliability of the output signal.

The uplink signal processing system 200 may include a multiplexer 210, an advance transport processing system (ATPS) 212, and a modulator 214. Pairs of multiplexers 210, advance transport processing systems 212, and modulators 214 may be provided for redundancy. That is, primary and back-up pairs of each may be provided.

The multiplexer 210 multiplexes the decoded channel signals from the local area network 32 into a multiplexed transport stream (MPTS). The multiplexer 210 may also act to insert advertising into the signal. Thus, the multiplexer 210 may act as a multiplexing module and as an ad insertion module. The multiplexer 210 may be a statistical multiplexer used to group signals from various local collection facilities. Various numbers of encoded channel signals may be multiplexed. In one constructed embodiment, eight channel signals were multiplexed at each multiplexer 210. The multiplexer 210 may receive different signals from different local collection facilities. Each multiplexer 210 may receive all of the signals to be combined for uplink to one transponder of the satellite.

The advance transport processing system (ATPS) 212 converts the transport stream from the multiplexer 210 into an advanced transport stream such as the DIRECTV® A3 transport stream. The ATPS 212 may support either ASI or MPEG-output interface for the broadcast path. Thus, the ATPS 212 acts as an encryption module.

The modulators 214 modulate the transport stream from the ATPS 212 and generate an RF signal at a frequency such as an L-band frequency. An RF switch 216 is coupled to the primary modulator and back-up modulator 214. The RF switch provides one output signal to the uplink RF system 202. The USPS 200 may also be coupled to a quality control (QC) station console 250. The quality control station console 250 may be coupled directly to the RF switch 216. The quality control station console 250 may also be coupled to a communication monitoring bus 252. The bus 252 may be used to communicate between various components used for monitoring and controlling the various components in the remote uplink facility and the local collection facilities. The bus 252 may, for example, be in communication with a technical services monitor console 254. The bus 252 may also be coupled to an advance broadcast management system (ABMS) server 256. As is illustrated in FIG. 3, both a primary server and a back-up server 256 are illustrated.

A compression system controller 260 may also be coupled to the bus 252. As is illustrated, both a primary and back-up compression system controller 260 may be provided. The compression system controller 260 may be coupled to a broadcast management system 262 as will be further described below. The ABMS system 256 and the compression system controller 260 may be used to control various functions and monitor various functions of the remote uplink facility and the local collection facilities. These functions will be further described below.

The compression system controller 260 is a centralized server which is used to control and monitor the receiving circuit modules within the chain of a remote uplink facility. The compression system controller 260 may be used to manage, configure, control and monitor the receiving circuit modules and the encoders therein. The compression system controller 260 may also control the routers, switches and receivers within the receiving circuit modules. The compression system controller may be physically located within the remote uplink facility. However, web access may be provided through a standard web browser for allowing users to interface, configure and control the various systems. In addition to controlling the receiving circuit modules and the statistical multiplexers, the compression system controller 260 may be used to initiate a redundancy switch to a back-up receiving circuit module or encoder within the local collection facilities. The compression system controller may also be used to initiate a switch to a back-up statistical multiplexer within the remote uplink facility 16. The compression system controller may also be used to update the remote broadcast management system 262.

Each of the components of the USPS 200 may be coupled to the bus 252. That is, the primary and back-up multiplexers 210, the primary and back-up ATPSs 212, the primary and back-up modulators 214, and the RF switch 216 may all be coupled to the bus 252.

The ABMS system 256 may be used for various monitoring such as transport level errors, video outages, audio outages, loss of connection from a redundancy controller or a data source, or a compression system controller 260.

The remote uplink facility may also include the diverse uplink facility or diverse site 42. The diverse site 42 may receive signals from the primary ATPS 212 in the event of a modulator 214 or switch failure 216. The transport stream signals provided from the primary or back-up advanced transport processing system 212 are communicated to the primary modulator or back-up modulator 214' of the diverse site 42. An RF switch 216' may be used to couple the output of either the primary modulator or the back-up modulator 214' to the uplink RF system 202. The ABMS system 256' may also be used to monitor the output of the diverse uplink facility 256'.

The network operation center 14 may be coupled to the IP network 32. The network operation center 14 may also be coupled to the remote uplink facility 200 through an ATM or IP network 280. The network operation center 14 may have a monitor and control console 282 and a monitoring decoder 284 for monitoring and controlling various functions of the various remote uplink facilities. The network operation center monitor and control console 282 may also be used to control and monitor the various local collection facilities 30. This may be performed directly or through the compression system controller 260.

Figure 4:
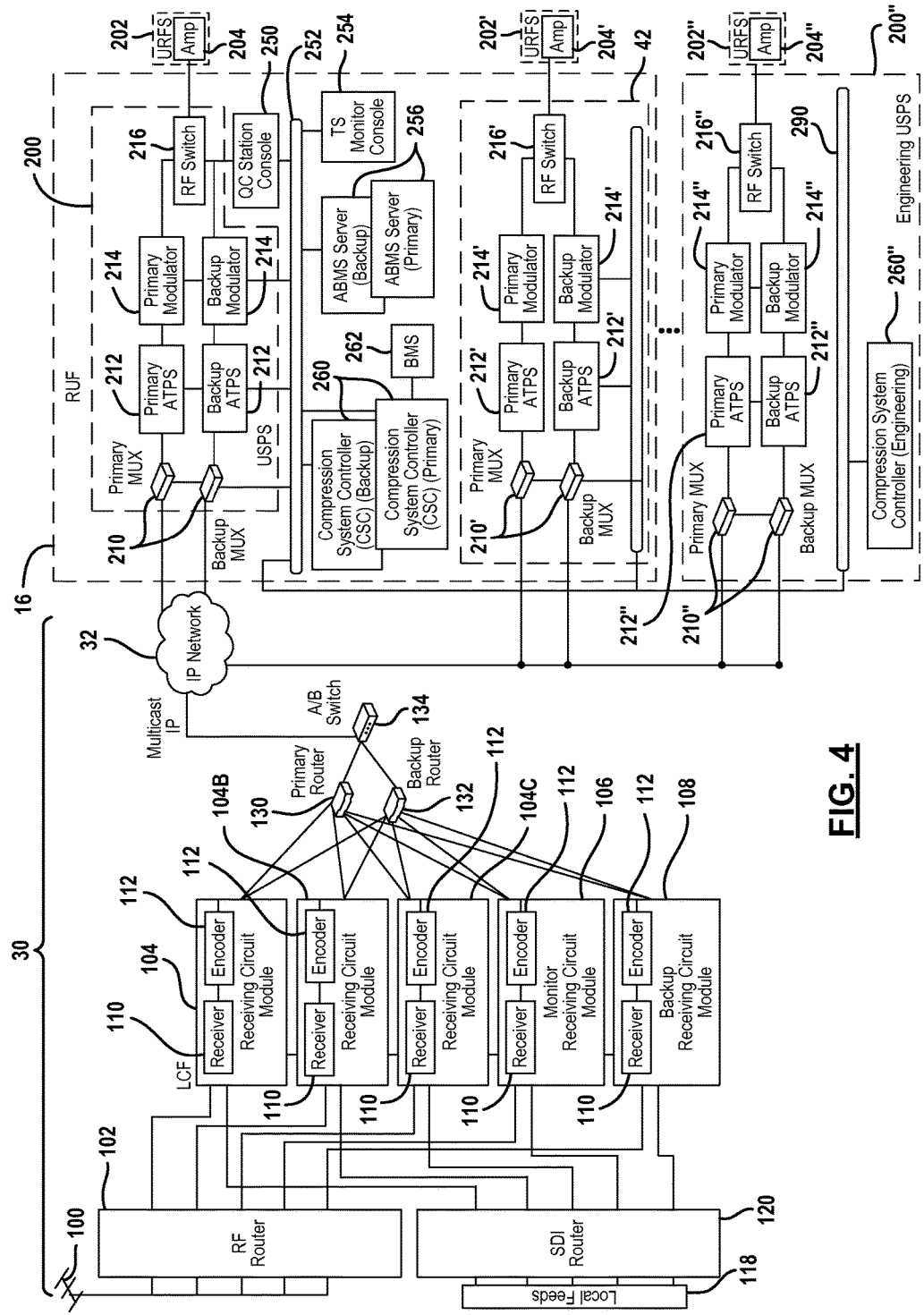
FIG. 4 is a detailed block diagrammatic view of a second embodiment of the collection and communication system illustrated in FIGS. 1 and 2.

Referring now to FIG. 4, a system similar to that of FIG. 3 is illustrated. The common components will thus not be described further. The system of FIG. 4 illustrates that multiple USPS circuits may be included in the remote facility. The multiple USPS circuits are illustrated with the same reference numerals as the USPS chain with primed numbers. The functions are the same as the unprinted components. The USPSs 200-200" may be referred to as a production USPS.

The system of FIG. 4 also illustrates an engineering uplink signal processing system 200". The engineering uplink signal processing system 200" may be coupled to the network 32 and/or the bus 252. The engineering uplink signal processing system 200" may be at the same location as one of the remote uplink facilities or a different location than the remote uplink facilities. The engineering uplink signal processing system 200" may be used when one of the remote uplink facilities is under maintenance or if an error occurs. Switching to the engineering uplink signal processing system 200" will be described below. The engineering uplink signal processing system 200" includes a primary and back-up MUX 210", a primary and back-up ATPS 212", a primary and back-up modulator 214" and an RF switch 216". The functioning of each of the components of the USPS is similar to those described above with respect to the production USPS 200 and thus will not be described. The output of the RF switch 216" is communicated to an uplink RF system 202" that includes an amplifier 204" for uplinking signals to a satellite. A compression system controller 260" may be in communication with the engineering USPS 200" through a bus 290.

Figure 5:
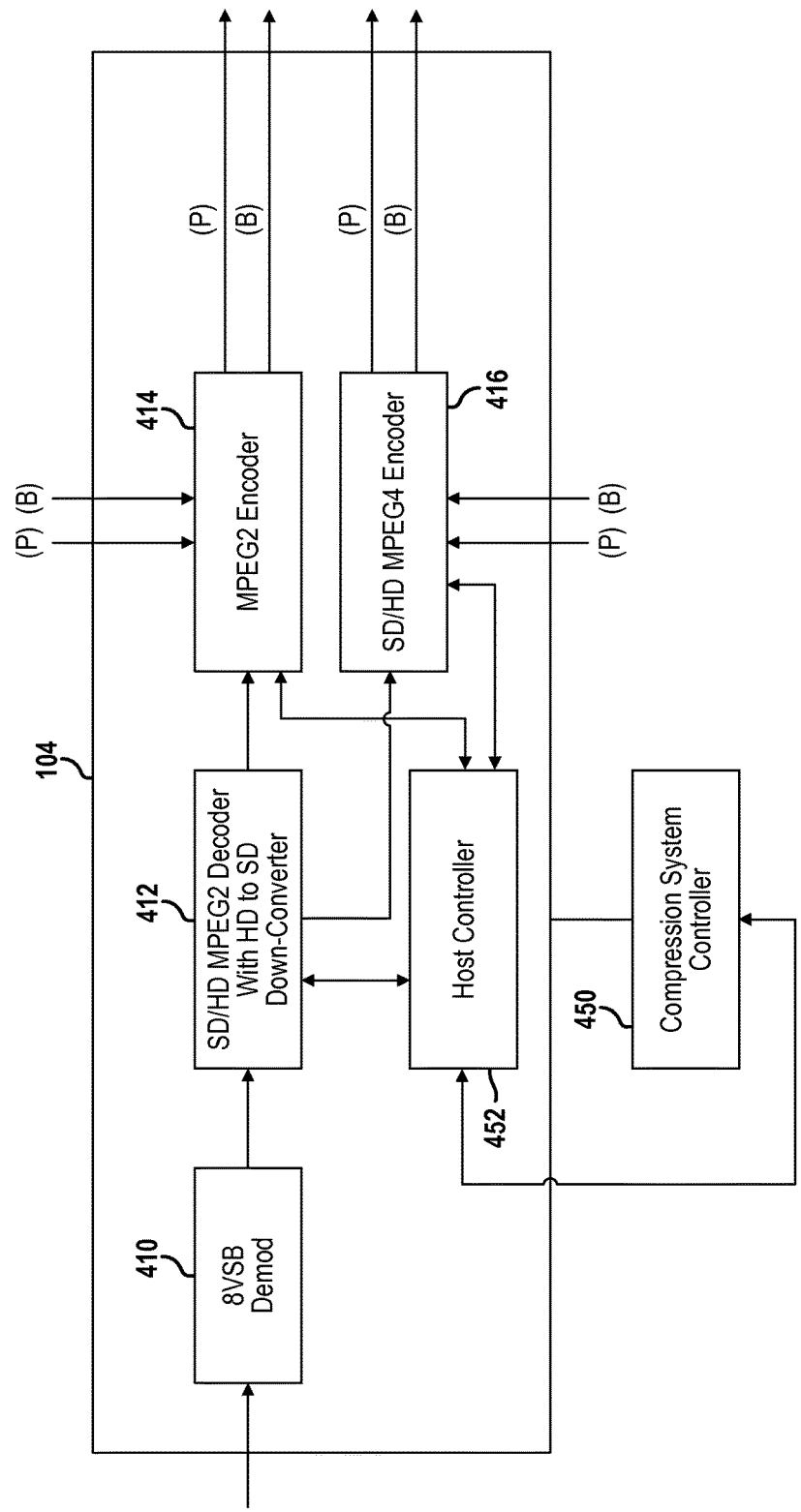
FIG. 5 is a block diagrammatic view of a receiving circuit module illustrated in FIGS. 3 and 4.

Referring now to FIG. 5, a block diagrammatic view of the receiving circuit module 104 is illustrated in further detail. In this embodiment, a demodulator 410 is provided. The demodulator 410 may be an ATSC demodulator which is illustrated as an 8VSB demodulator 1410. The 8VSB demodulator receives over-the-air television signals from the antenna 100 illustrated in FIGS. 3 and 4. The internal demodulator 410 may support various frequencies including 54 to 863 megahertz with 6 hertz bandwidth channel spacing. RF input may be an F-type connector input.

The demodulated signal from the demodulator 410 is provided to the SV/HD MPEG-2 decoder 412 which may include a downconvertor. That is, if an HD signal is received and a standard-definition signal is desired to be output, the HD signal may be downconverted to an SD signal. The output of the decoder may be provided to an MPEG-2 encoder 414 and to a standard-definition/high-definition MPEG-4 encoder 416. The decoded signal from the decoder 412 may be provided to the MPEG-4 encoder 416 through an SD-SDI loop. The decoder 412 may provide both HD and SD decoding. For MPEG-2 decoding, horizontal lines of 50 megabits per second may be provided. For SD encoding, 15 megabits per second may be provided. The decoder 412 may pass through the audio from the compressed input source. The decoder 412 may also provide selectable letter box cut-out (pan and scan) conversion of 16:9 HD content using 4:3 standard-definition selectable by a central control system. The MPEG-2 encoder 414 may provide 480×480 video resolution and may have selectable encoding parameters. The MPEG-4 encoder 416 may provide 1080i, 720p and 480i video formats that are user-selectable.

Both encoders 414 and 416 may have primary and back-up IP outputs and primary and back-up inputs denoted (P) and (B) respectively. Each of the primary inputs/outputs and backup inputs/outputs have addresses to be used in controlling the system. The encoders 414 and 416 may generate a variable bit rate output which may be compliant with MPEG-2 specifications. Piecewise, the bit rate may be constant but changes at the program clock reference (PCR).

For the audio corresponding to the video, AC-3 audio may be provided at the outputs. The encoder may provide Dolby Digital® AC-3 pass-through with glitch suppression for two audio services. Down mixing and transcoding of Dolby Digital® AC-3 into MPEG-1 layer 2 audio may also be provided by the encoder. AC-3 audio may be an output of the audio encoder. Also, MPEG-1 layer 2 audio signals may also be output from one of the encoders 414, 416.

A compression system controller 450 may be in communication with the receiving unit 104. More specifically, the compression controller 450 may be in communication with a host controller 452 which is disposed within the receiving unit 104. The receiving unit 104 may receive configuration signals from the compression system controller 450. That is, each encoder 414, 416 may be configured using the compression system controller 450 and host controller 452. Details of the compression system controlling the encoders 414 and 416 will be further described below. The configurations of the encoder and other portions of the receiving unit 104 may be controlled by the compression system controller 450 and the host controller 452. The control may include, but is not limited to, input addresses and output addresses of the primary and backup inputs and outputs of the encoder.

Figure 6:
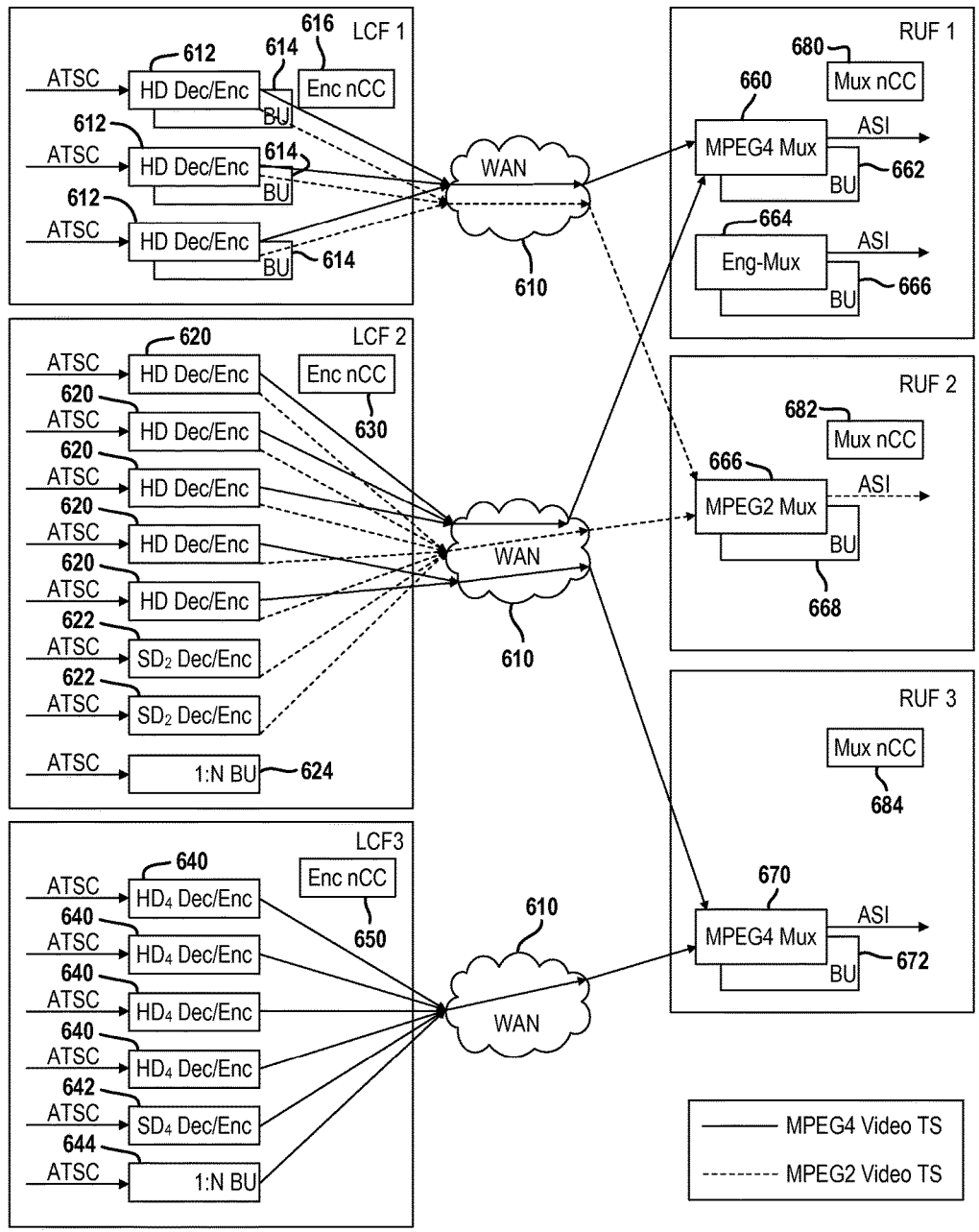
FIG. 6 is a block diagrammatic view of local collection facilities communicating signals to a remote uplink facility.

Referring now to FIG. 6, a block diagrammatic view of a sample network is illustrated. A first local collection facility LCF1, a second local collection facility LCF2 and a third local collection facility LCF3 are illustrated in communication with a wide-area network 610. The wide-area network 610 illustrated may be the same network but is broken up for convenience. The wide-area network 610 is in communication with a first remote uplink facility RUF1, a second remote uplink facility RUF2, and a third remote uplink facility RUF3. Each of the local collection facilities and the remote uplink facilities may be configured in the same or different manners. The local collection facility LCF1 includes three high-definition receiving circuit modules 612. These may be referred to as receiving units. The six high-definition decoder encoders 612 also each include a backup receiving circuit module 614. Because three high-definition receiving circuit modules 612 are illustrated, three receiving circuit modules 614 are also provided. This relationship is referred to as a one-to-one correspondence between the primary and backup receiving circuit modules. It should be noted that each receiving circuit module and each backup receiving circuit module may include a unique multicast source address and a unique media access control (MAC) address.

A (receiving circuit modules) compression controller 616 may control the primary and backup receiving circuit modules so that at any point in time, only one primary or backup encoder is actively outputting on the active encoder multicast address. The control may be performed by a change signal that causes the address to change. The compression controller 616 is in communication with each of the receiving circuit modules 612/614 even though the LCF1 drawing does not depict it (for simplicity).

As is illustrated in the local collection facility, both MPEG-4 video and MPEG-2 video are generated from the receiving circuit modules.

In the local collection facility 2, receiving units including a high-definition receiving circuit module 620 are illustrated. In this example, five high-definition receiving circuit modules are illustrated. Also, two standard-definition receiving circuit modules 622 are illustrated. The high-definition receiving circuit modules 620 generate both a high-definition MPEG-4 video transport stream and an MPEG-2 video transport stream. The standard-definition receiving circuit modules 622 only generate an MPEG-2 video transport stream.

In this example, only one backup receiving circuit module 624 is illustrated. The backup receiving circuit module 624 may act as a backup receiving circuit module for any of the receiving circuit modules 620, 622 at the local collection facility regardless of the remote uplink facility receiving the output. A compression controller 630 may perform the same function as compression controller 616.

With respect to the addresses, each primary receiving circuit module and the backup receiving circuit module have a unique media access control (MAC) address. The primary and backup receiving circuit modules may also include a unique multicast destination address for the active encoder in a different unique multicast address destination for the standby encoder within each receiving circuit module. The compression controller 630 permits only one encoder as actively outputting a particular transport stream.

The local collection facility LCF3 includes high-definition receiving circuit modules 640. The high-definition receiving circuit modules 640 output high-definition signals exclusively. In this example, four high-definition receiving circuit modules are set forth. The local collection facility LCF3 also includes one standard-definition receiving circuit module 642. One backup receiving circuit module 644 is also provided which may be substituted for any of the receiving circuit modules 640, 642.

The compression controller 650 is used to control the receiving circuit modules 640, 642 and 644. That is, the address and configuration of the backup encoder 644 may be controlled by the encoder compression controller 650.

The first remote uplink facility RUF1 includes an MPEG-4 multiplexer 660 and a backup multiplexer 662. The MPEG-4 multiplexer merely means it is used to receiving MPEG-4 signals from the local collection facilities LCF1-3.

An engineering multiplexer 664 and a backup (BU) engineering multiplexer 666 may also be provided. In this example, MPEG-4 transports streams from the local collection facility LCF1 and the local collection facility LCF2 may be communicated to the MPEG-4 multiplexer 660 or 662. In this example, an MPEG-2 multiplexer is not provided in RUF1.

The remote uplink facility RUF2 may include an MPEG-2 multiplexer 666 and a backup MPEG-2 multiplexer 668 that receive MPEG-2 signals from the local collection facilities. The MPEG-2 transport stream signals in this example originate from the local collection facility LCF1 and LCF2.

The remote uplink facility RUF3 may include an MPEG-4 multiplexer 670 and a backup MPEG-4 multiplexer 672. The MPEG-4 transport streams provided to the MPEG-4 multiplexers 670, 672 originate from the second local collection facility LCF2 and the third local collection facility LCF3.

Each of the multiplexers 660, 664, 666, 668, 670 and 672 may generate an asynchronous serial interface (ASI) signal.

Each of the remote uplink facilities RUF1, RUF2, and RUF3 includes a respective multiplexer compression control system 680, 682 and 684. The multiplexer compression control systems allow the backup multiplexer to join a multicast stream from an online encoder.

Figure 7:
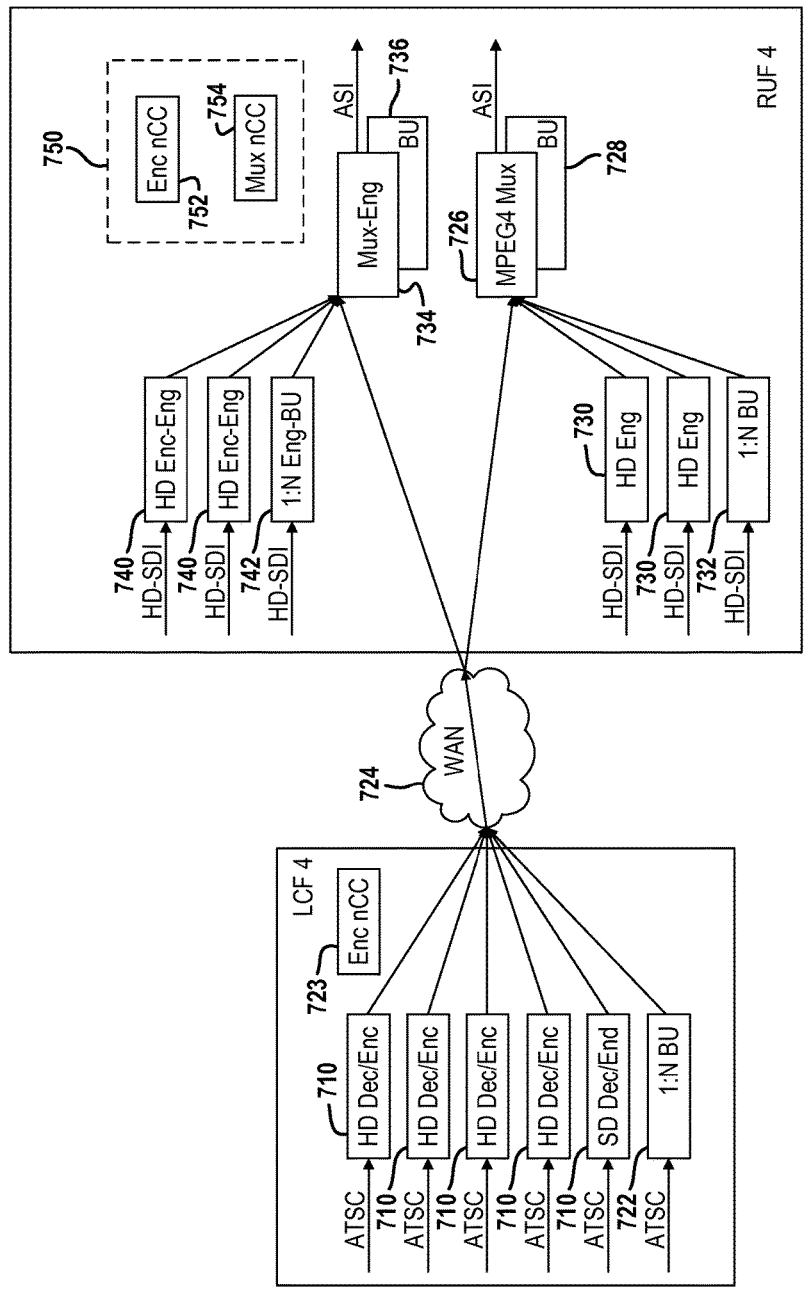
FIG. 7 is another block diagrammatic view of a local collection facility communicating signals to the remote uplink facility.

Referring now to FIG. 7, another configuration of the system is illustrated. In this embodiment, four HD receiving circuit modules 710 and one SD receiving circuit module 720 are used for receiving ATSC signals. One backup receiving circuit module 722 is also used in the system. A compression system controller 723 may be used in a similar manner as described above.

A wide-area network 724 communicates the signals from the receiving circuit modules to an MPEG-4 multiplexer 726 of a remote uplink facility RUF4. The MPEG-4 multiplexer 726 may also have a backup multiplexer 728 associated therewith.

The remote uplink facility RUF4 may also include encoders for receiving signals directly at the remote uplink facility. In this example, two HD encoders 730 are provided as well as a backup encoder 732 for use in replacement of the HD encoders 730.

An engineering multiplexer 734, as well as a backup engineering multiplexer 736, may also be included in the remote uplink facility RUF4. The engineering multiplexer 734 and backup engineering multiplexer 736 may receive signals from a high-definition engineering encoder 740. Two high-definition engineering encoders are illustrated in FIG. 7. A backup engineering encoder 742 may also be used. Both the high-definition engineering encoders and high-definition encoders may be used to receive high-definition serial device interface signals.

A compression controller 750 may incorporate an encoder compression controller 752 and a multiplexer compression controller 754. The encoder compression controller 752 controls the configuration including the port addresses of the encoders while the multiplexer compression controller 754 controls the operation of the engineering and primary and backup encoders 726, 728, 734 and 736. A change signal may be used to change to another address.

In this embodiment, the multiplexers may not only receive signals from a local collection facility but also directly through an encoder. This configuration may also be used with multiple local collection facilities.

It should be noted that in the above embodiments, the multiplexer may receive signals from various local collection facilities. Each of the signals for a multiplexer may be combined in a multiplexed stream which is uploaded to a single transponder. That is, each multiplexer may correspond to a single transponder.

Figure 8:
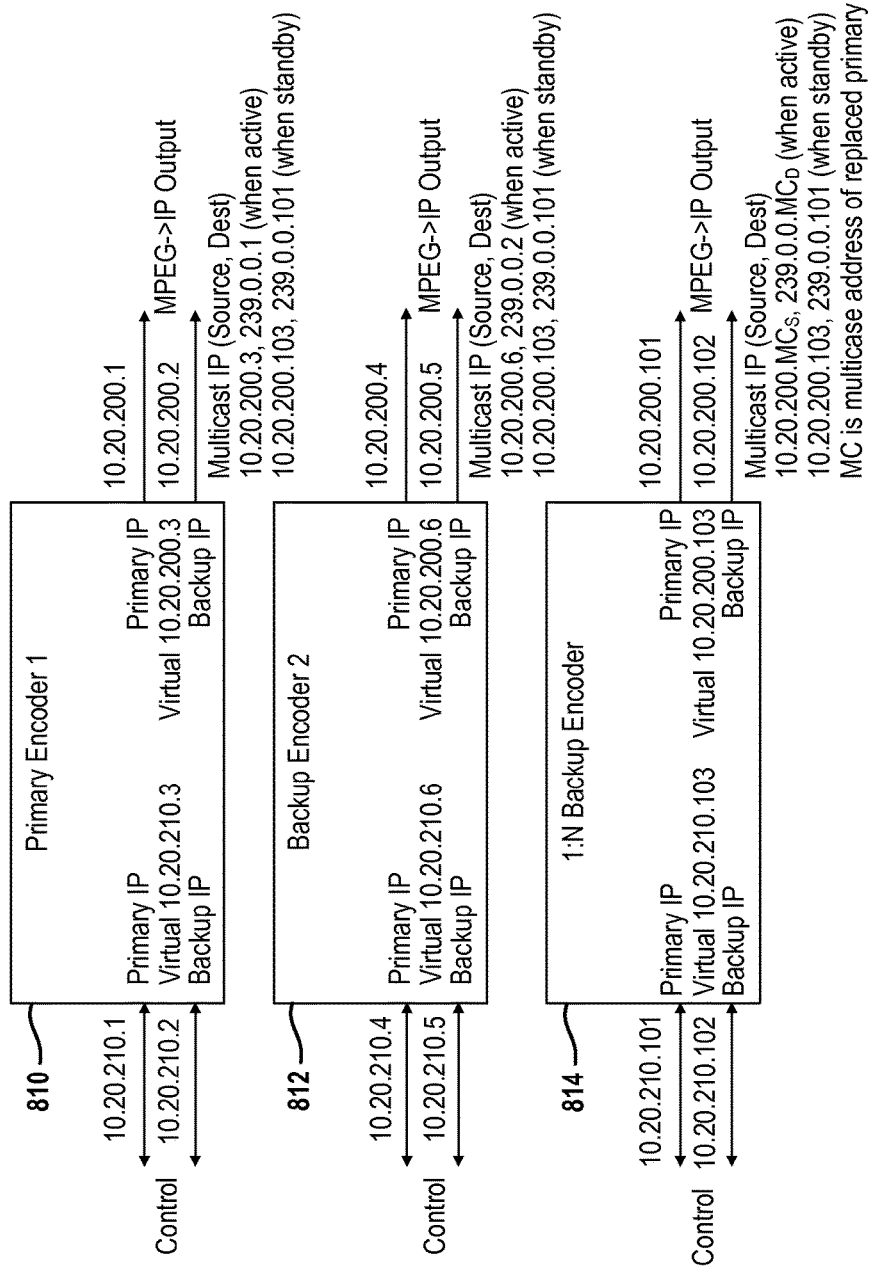
FIG. 8 is a block diagrammatic view of encoders of a local collection facility having 1:N backup encoder.

Referring now to FIG. 8, an example illustrating the IP addresses for a primary encoder 810, a second primary encoder 812 and a backup encoder 814 is set forth. In this example, a one-to-N backup encoding scheme is provided. It should be noted that encoders from a one-to-N and a one-to-one backup scheme may be communicated to the same multiplexer. As is illustrated, a single source multicast address will be assigned for each MPEG-2 video output and MPEG-4 video output. A unique destination multicast address will be assigned for each MPEG-2 video and each MPEG-4 video transport stream. The backup encoder will use the primary encoders source and destination multicast address when the backup encoder replaces the primary encoder. In this way, a backup encoder can be brought online without any changes to the downstream multiplexer. The abbreviations $MC_S$ and $MC_D$ are used in the source end destination multicast IP addresses. These variables are replaced with the appropriate variables for the source and destination when the backup encoder is switched to replace one of the primary encoders. As is illustrated, the encoders implement a unique IP address and MAC address for the primary connections and a unique IP address and MAC address for the backup connections on each encoder. This allows communication explicitly to either the encoder primary connection or the encoder backup connection. Encoders also include a shared virtual IP source address and a shared virtual MAC address that is used for multicast transmission from the encoder. At any one time, the encoder is configured to output from only one of the primary or backup IP ports.

A change signal may be used to control the ultimate address that is used in the broadcast. The change signal may control which output encoder address is used to communicate to the encoder.

Figure 9:
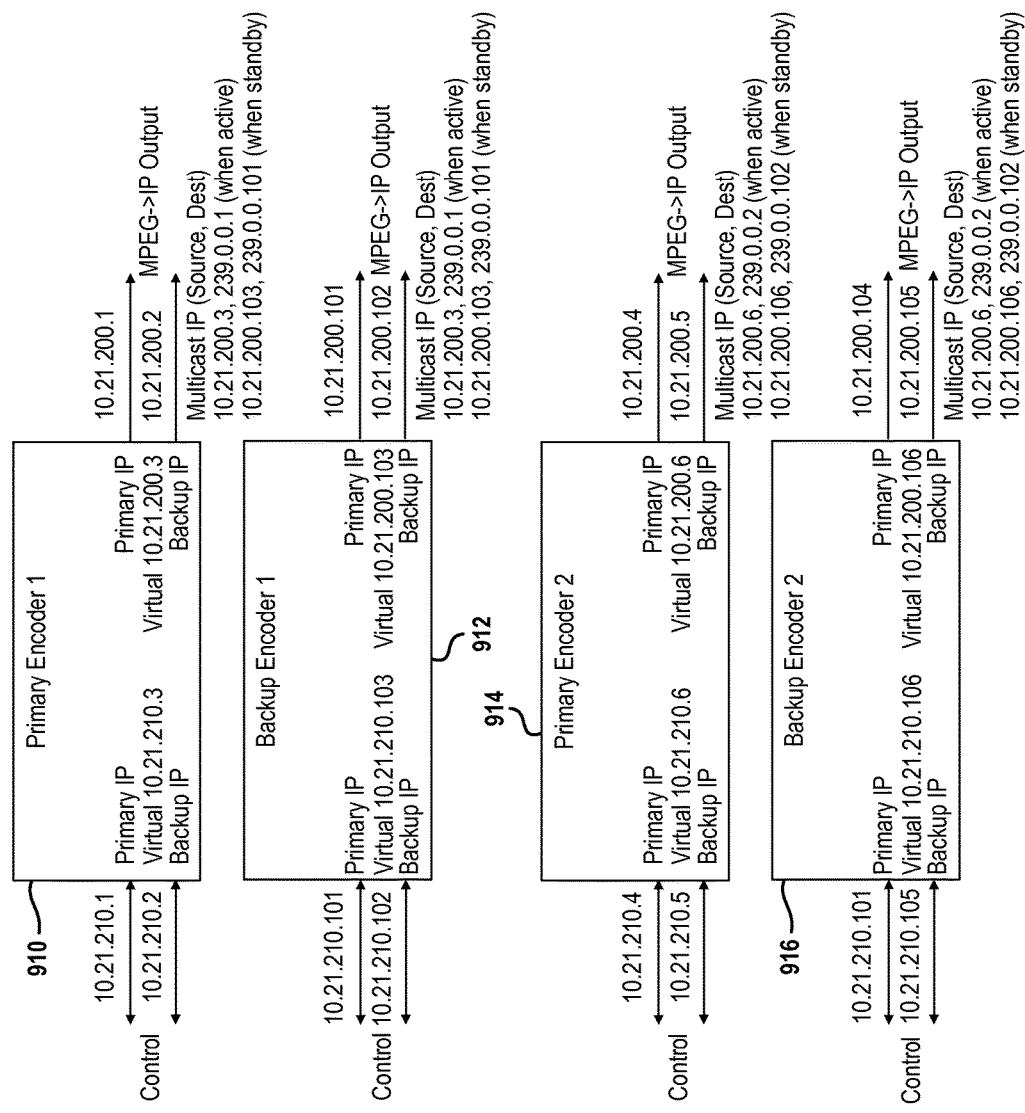
FIG. 9 is a block diagrammatic view of a local collection facility having 1:1 backup encoders.

Referring now to FIG. 9, a one-to-one redundant encoder configuration is set forth. In this example, a first primary encoder 910 and a backup encoder 912 are illustrated. Likewise, another pair including a primary encoder 914 and a corresponding backup encoder 916 is illustrated. The control signals from the compression control system are used for configuring the addresses of the encoders.

Figure 10:
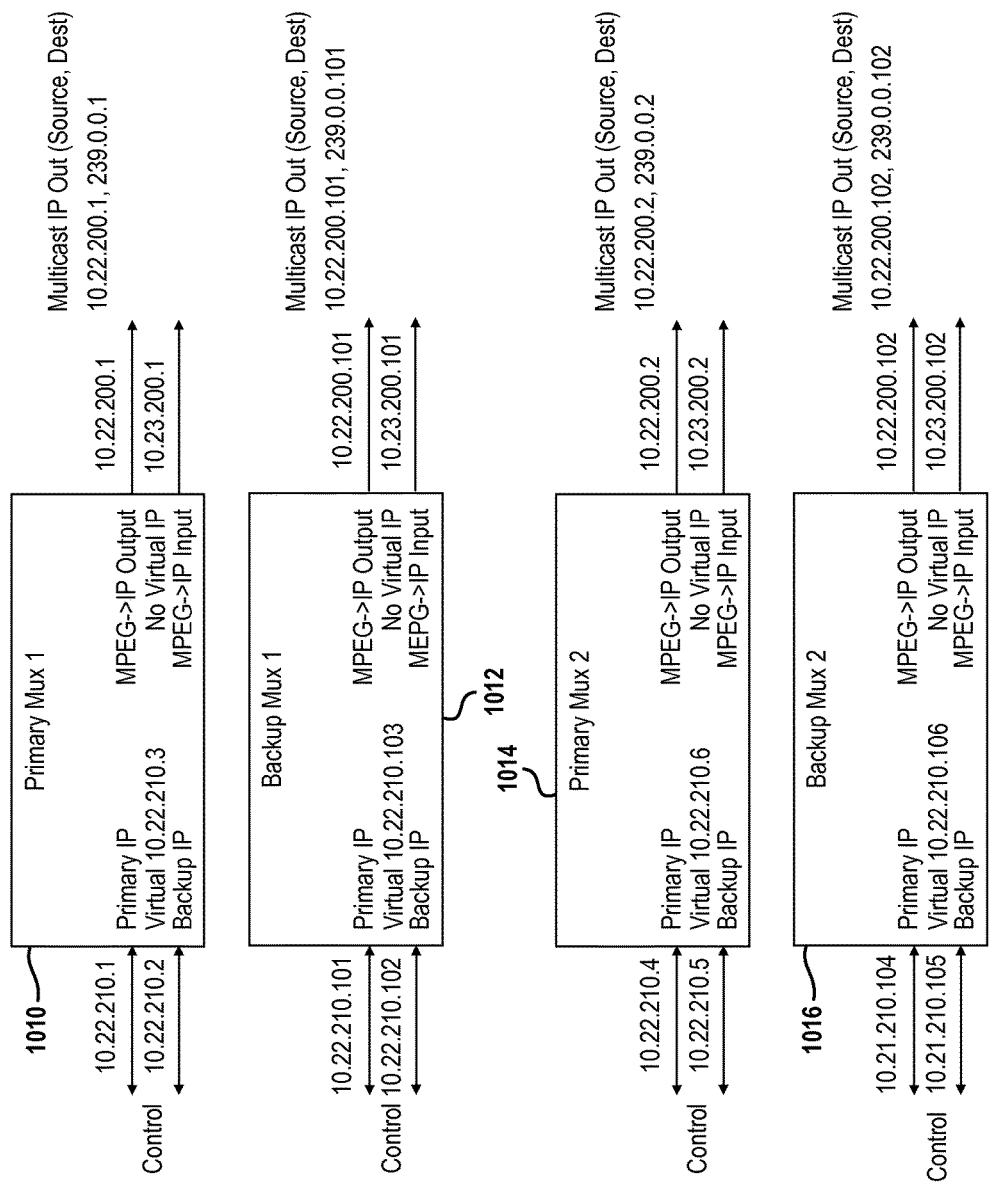
FIG. 10 is a block diagrammatic view of the local collection facility having primary and backup multiplexers.

Referring now to FIG. 10, a primary multiplexer 1010 and a backup multiplexer 1012 for the primary multiplexer 1010 is illustrated. Likewise, a primary multiplexer 1014 and a backup multiplexer 1016 for the primary multiplexer 1014 is illustrated. Each multiplexer has a unique control input IP address. The IP addresses are used to control the operation of the primary or backup multiplexer and the addresses thereof. The multiplexers also include an IP output and an IP input. The IP inputs receive signals from the primary encoders. The outputs communicate signals to the transport processing system 212 illustrated in FIG. 3. The control inputs to the multiplexers are in communication with the compression system controller.

Figure 11:
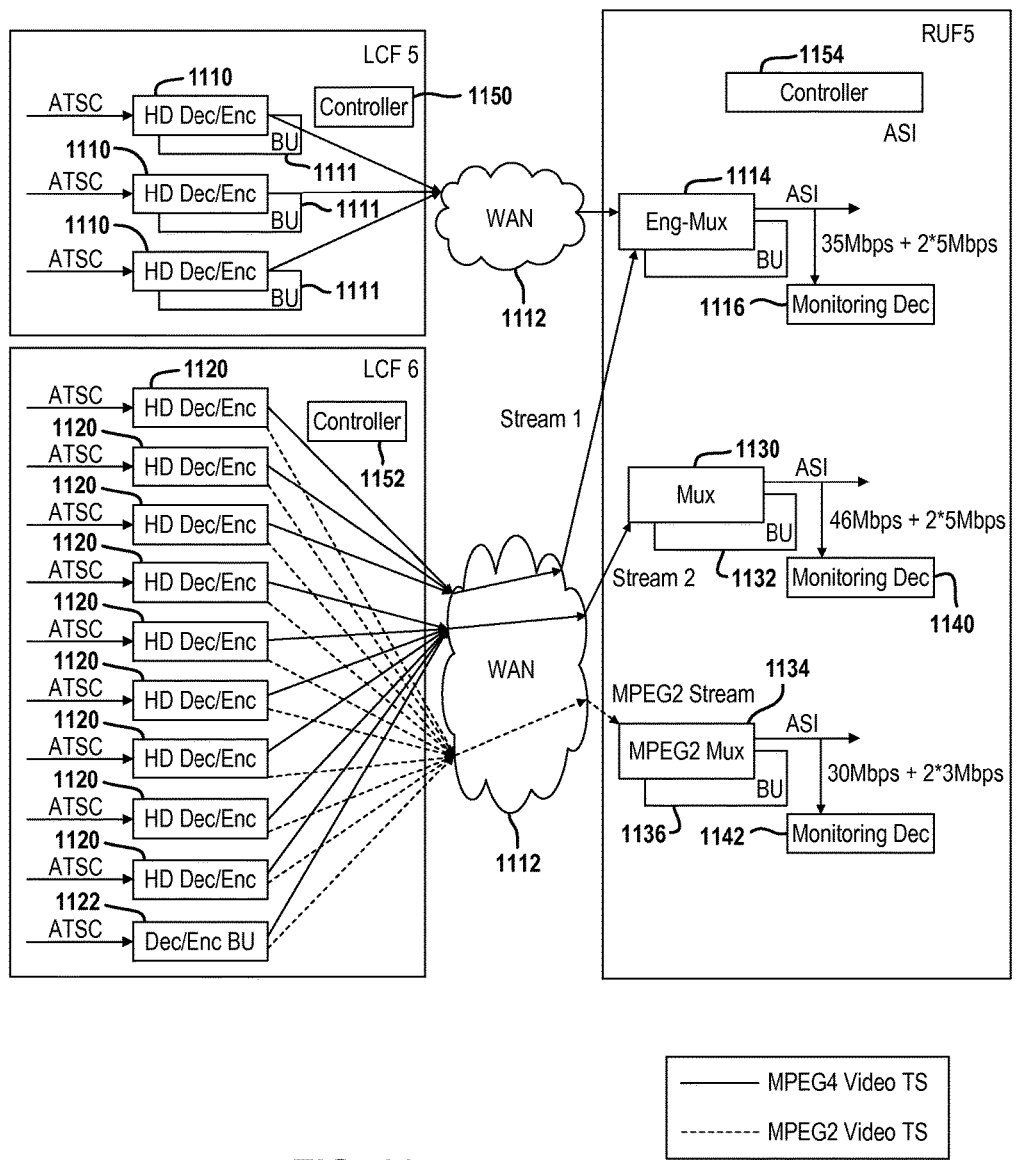
FIG. 11 is another block diagrammatic view of local collection facilities communicating to a remote uplink facility with monitoring decoders.

Referring now to FIG. 11, an example illustrating monitoring decoders in a remote uplink facility RUF5 is set forth. A local collection facility LCF5 includes high-definition receiving circuit modules 1110 and back-up receiving circuit modules 1111 that communicate high-definition signals through the wide-area network 1112 to a multiplexer 1114. The multiplexer 1114 has a monitoring decoder 1116 coupled thereto that receives the ASI signal. Likewise, a local collection facility LCF6 includes a plurality of high-definition receiving circuit modules 1120 and a backup receiving circuit module 1122. The wide-area network 1112 communicates the signals from the receiving circuit modules 1120, 1122 to a multiplexer 1130 or backup multiplexer 1132. The multiplexer 1130 and backup multiplexer 1132 receive MPEG-4 streams. An MPEG-2 multiplexer 1134 and backup MPEG-2 multiplexer 1136 receive MPEG-2 signals from the local collection facility LCF6. A monitoring decoder 1140 is used to monitor the output of the multiplexer and backup multiplexer 1132. A monitoring decoder 1142 is used to monitor the MPEG-2 multiplexer 1134 and the backup MPEG-2 multiplexer 1136. The local collection facility LCF5 includes a compression system controller 1150. The local collection facility LCF6 includes a compression system controller 1152. The remote uplink facility RUF5 may also include a remote uplink facility compression system controller 1154. It should be noted that the MPEG-4 transport stream out of the multiplexer is comprised of the same transport stream which includes the video statistical multiplexer pool, a fixed-rate audio and a fixed-rate video. The transport stream may also include a constant bit rate audio and video from a monitoring or engineering encoder.

By using the monitoring decoders 116, 1140 and 1142, a look-before-you-leap configuration may be established. The compression system controller 1150, 1152 may copy the encoder configuration from the online encoder to a backup encoder and then command the encoder to start outputting an MPEG-IP stream without replacing the current online encoder in the multiplexer output statistical multiplexer pool. The monitoring decoder may tune to the backup encoder to verify the video content and quality. The operator of the system may then command the compression system controller 1150, 1152 to remove the current online encoder from the output multiplexer and replace it with the backup encoder. The monitoring decoder may be able to switch between monitoring an online encoder, monitoring an encoder or monitoring a mirrored encoder by only decoding a different service identifier in the multiplexer output stream.

Figure 12:
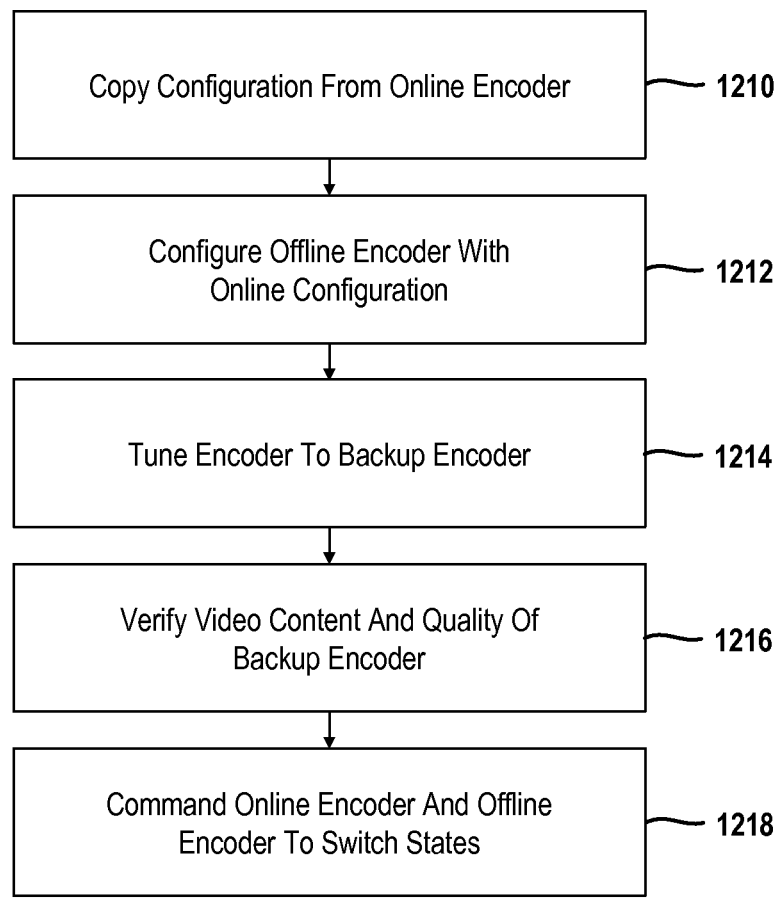
FIG. 12 is a method for switching between online and offline encoders in the local uplink facility.

Referring now to FIG. 12, a method for configuring an online encoder is set forth. In step 1210, a configuration from an online encoder is copied. In step 1212, the offline encoder is configured with the online encoder configuration. In step 1214, the monitoring decoder is tuned to the backup decoder encoder. In step 1216, the operation of the backup decoder encoder is verified by monitoring the quality of the video content and quality of the signal. In step 1218, the online encoder may be commanded to an offline status and the offline encoder commanded to an online status. In performing the above functions, the compression controller switches the address of the backup encoder to the address of the output of the online decoder/encoder.

Figure 13:
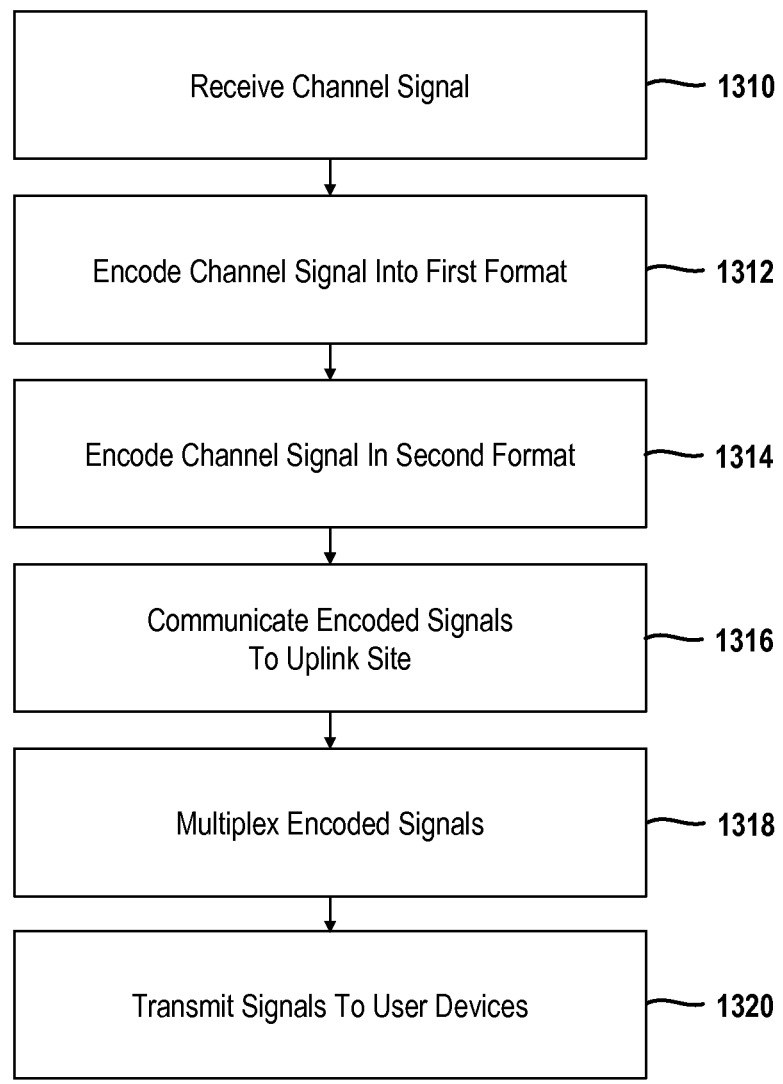
FIG. 13 is a flowchart of a method for transmitting signals to user devices using the receiving circuit modules.

Referring now to FIG. 13, a summary of a method for providing signals for uplink is set forth. In step 1310, a channel signal is received. In step 1312, the same channel signal is encoded into a first format and in step 1314 the same channel is encoded into a second format. The first format may be MPEG-2 encoding and the second format may be MPEG-4 encoding. In step 1316, the encoded signals are communicated to one or more uplink sites. It should be noted that the different encoded signals, such as the MPEG-2 signal and the MPEG-4 signal, may be communicated to different remote uplink facilities. This allows greater flexibility in statistically multiplexing the signals. In step 1318, the received signals at the multiplexer are multiplexed. Different local collection facilities may have signals that are communicated to a multiplexer. A multiplexer may have an output that corresponds to one single transponder on one single satellite. Thus, the entire output of one multiplexer corresponds to the input of one transponder of the satellite.

In step 1320, the encoded and multiplexed signals are ultimately transmitted to user devices. As mentioned above, various user devices may include standard-definition and/or high-definition signals. The various user devices may only be capable of receiving MPEG-2 or MPEG-4 signals. Thus, any of the receiving units or user devices may receive one of the encoded channel signals. The transmission of the signals to a user device may include forming a transport stream in a transport processing system 212 illustrated in FIG. 3 modulating the signal in the modulator 214 of FIG. 3 and communicating the modulated signal to an uplink RF switch 202 illustrated in FIG. 3.

In the above process, it is clear that the first formatted signal may be communicated to a first multiplexer, and the second formatted signal may be communicated to a second multiplexer. The second multiplexer may be located in a different remote uplink facility.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A method of operating a receiving circuit module comprising:
   receiving a first television signal at the receiving circuit module in a first local collection facility;
   encoding the first television signal within the receiving circuit module to form a first encoded signal;
   encoding the first television signal within the receiving circuit module to form a second encoded signal encoded differently than the first encoded signal;
   communicating the first encoded signal to a first multiplexer at a first remote facility through a terrestrial network, said first remote facility spaced apart from the first local collection facility; and
   communicating, through the terrestrial network, the second encoded signal to a second multiplexer different than the first multiplexer at the first remote facility or a second remote facility.

2. A method as recited in claim 1 wherein receiving a first television signal at the receiving circuit module comprises receiving the first television signal at the local collection facility spaced apart from a first remote uplink facility and a second remote uplink facility.

3. A method as recited in claim 2 wherein communicating the first encoded signal comprises communicating the first encoded signal to the first multiplexer at a first remote uplink facility; and
   wherein communicating the second encoded signal comprises communicating the second encoded signal to the second multiplexer at the second remote uplink facility.

4. A method of operating a receiving circuit module comprising:
   receiving a first signal at the receiving circuit module in a local collection facility spaced apart from a first remote facility and a second remote facility;
   encoding the first signal within the receiving circuit module to form a first encoded signal;

encoding the first signal within the receiving circuit module to form a second encoded signal encoded differently than the first encoded signal;

generating a first output signal at the receiving circuit module corresponding to the first encoded signal from a first address until a change signal is received, thereafter encoding the first output signal with a backup encoder having the first address to form a backup encoded signal and communicating the backup encoded signal to the first remote facility;

generating a second output signal at the receiving circuit module corresponding to the second encoded signal;

communicating the first encoded signal to a first multiplexer; and communicating the second encoded signal to a second multiplexer different than the first multiplexer.

5. A method as recited in claim 1 wherein communicating the first encoded signal and communicating the second encoded signal comprises communicating the first encoded signal through an Internet Protocol network and communicating the second encoded signal through the Internet Protocol network.

6. A method as recited in claim 4 further comprising monitoring the backup encoded signal.

7. A method as recited in claim 6 further comprising discontinuing communicating the first encoded signal to a first multiplexer after monitoring the backup encoded signal.

8. A method as recited in claim 1 wherein receiving the first television signal comprises receiving an over-the-air television signal.

9. A method as recited in claim 8 wherein receiving the first television signal comprises decoding the over-the-air television signal.

10. A method as recited in claim 8 wherein receiving comprises receiving the over-the-air television signal and tuning, demodulating and decoding the over-the-air television signal to form the first signal.

11. A method as recited in claim 1 wherein encoding the first television signal within the receiving circuit module to form a first encoded signal comprises encoding the first television signal within the receiving circuit module to form an MPEG-2 encoded signal and wherein encoding the first television signal within the receiving circuit module to form a second encoded signal comprises encoding the first television signal within the receiving circuit module to form an MPEG-4 encoded signal.

12. A method as recited in claim 1 wherein receiving a first television signal at the receiving circuit module comprises receiving the first signal at the first local collection facility spaced apart from a first remote uplink facility and further comprising receiving a second television signal at a second receiving circuit module at a second local collection facility wherein communicating the second encoded signal comprises communicating the second encoded signal to the second multiplexer from the second local collection facility.

13. A method as recited in claim 1 wherein generating a first output signal and generating a second output signal comprises simultaneously generating the first output signal and the second output signal at the receiving circuit module.

14. A system comprising:

a first local collection facility comprising a receiving circuit module having:

a housing having an input for a first television signal;

a first encoder disposed within the housing encoding the first television signal to form a first encoded signal; and a second encoder disposed within the housing encoding the first television signal to form a second encoded signal having a different format than the first television signal;

a first remote facility spaced apart from the first local collection facility, said first remote facility comprising a first multiplexer receiving the first encoded signal through a terrestrial network; and a second multiplexer different than the first multiplexer receiving the second encoded signal.

15. A system as recited in claim 14 wherein the receiving circuit module comprises a decoder decoding the first signal.

16. A system as recited in claim 14 wherein the first encoded signal comprises an MPEG-2 encoded signal and the second encoded signal comprises an MPEG-4 encoded signal.

17. A system as recited in claim 14 wherein the first multiplexer and second multiplexer are disposed within a first remote uplink facility.

18. A system as recited in claim 17 wherein the first remote uplink facility comprises a monitoring decoder.

19. A system as recited in claim 14 wherein the first multiplexer is disposed in a first remote uplink facility and the second multiplexer is disposed in a second uplink facility.

20. A system as recited in claim 14 further comprising an IP network disposed between the first multiplexer, the second multiplexer, the first encoder, and the second encoder.

* * * * *